United States Patent
Lee

(10) Patent No.: US 10,982,964 B2
(45) Date of Patent: Apr. 20, 2021

(54) NAVIGATION APPARATUS FOR VEHICLE, METHOD OF UPDATING MAP DATA THEREOF AND VEHICLE USING THE SAME

(71) Applicants: HYUNDAI MOTOR COMPANY, Seoul (KR); KIA MOTORS CORPORATION, Seoul (KR)

(72) Inventor: Yong Ho Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 105 days.

(21) Appl. No.: 16/212,070

(22) Filed: Dec. 6, 2018

(65) Prior Publication Data
US 2020/0072621 A1   Mar. 5, 2020

(30) Foreign Application Priority Data

Sep. 4, 2018 (KR) .......................... 10-2018-0105333

(51) Int. Cl.
  *G01C 21/34* (2006.01)
  *G06F 16/23* (2019.01)
  *G06F 16/29* (2019.01)

(52) U.S. Cl.
  CPC .............. *G01C 21/34* (2013.01); *G06F 16/23* (2019.01); *G06F 16/29* (2019.01)

(58) Field of Classification Search
  CPC .......... G06F 16/23; G06F 16/29; G01C 21/34
  See application file for complete search history.

(56) References Cited

U.S. PATENT DOCUMENTS

| | | | | |
|---|---|---|---|---|
| 8,744,757 | B2* | 6/2014 | Choi ..................... | G01C 21/32 701/428 |
| 8,942,920 | B1* | 1/2015 | Davidson ............... | G01C 21/32 701/450 |
| 9,874,451 | B2* | 1/2018 | Larroy .................. | B60W 30/14 |
| 2013/0345977 | A1* | 12/2013 | Shimizu ................ | G01C 21/34 701/533 |
| 2014/0058661 | A1* | 2/2014 | Choi .................... | G09B 29/106 701/428 |

(Continued)

FOREIGN PATENT DOCUMENTS

EP    2498057 A1 *  9/2012 ............. G01C 21/32

OTHER PUBLICATIONS

Machine Translation of Dieter (EP-2498057-A1) (Year: 2012).*

*Primary Examiner* — Thomas G Black
*Assistant Examiner* — Tarek Elarabi
(74) *Attorney, Agent, or Firm* — Morgan, Lewis & Bockius LLP

(57) ABSTRACT

A navigation apparatus for a vehicle includes: a communication device, a memory, a route search processor, and a controller for controlling the communication device, the memory, and the route search processor. The controller for the traveling route to the destination when a request for searching for the traveling route to the destination is received, checks whether new map data of regions located on the traveling route is present when the traveling route is searched for, controls the communication device to receive the new map data of the regions from an external server when the new map data of the regions is present, and updates the map information based on the received new map data.

16 Claims, 6 Drawing Sheets

(56) References Cited

U.S. PATENT DOCUMENTS

| | | | | |
|---|---|---|---|---|
| 2016/0154643 A1* | 6/2016 | Zhang | ............ | G01C 21/26 |
| | | | | 717/169 |
| 2016/0252904 A1* | 9/2016 | Sakai | ............ | B60W 50/14 |
| | | | | 701/26 |
| 2016/0313132 A1* | 10/2016 | Larroy | ............ | G01C 21/34 |
| 2016/0370193 A1* | 12/2016 | Maischberger | ........ | G01C 21/34 |
| 2017/0097943 A1* | 4/2017 | Pfeifle | ............ | G06F 16/2379 |
| 2017/0122749 A1* | 5/2017 | Urano | ............ | G01S 19/42 |
| 2019/0293436 A1* | 9/2019 | Flossbach | ............ | G01C 21/32 |

* cited by examiner

FIG. 4

| A1 | A2 | A3 | A4 | A5 |
|----|----|----|----|----|
| B1 | B2 | B3 | B4 | B5 |
| C1 | C2 | C3 | C4 | C5 |
| D1 | D2 | D3 | D4 | D5 |
| E1 | E2 | E3 | E4 | E5 |

NAVIGATION APPARATUS FOR VEHICLE, METHOD OF UPDATING MAP DATA THEREOF AND VEHICLE USING THE SAME

CROSS REFERENCE TO RELATED APPLICATION

This application claims the benefit of Korean Patent Application No. 10-2018-0105333, filed on Sep. 4, 2018, which is hereby incorporated by reference as if fully set forth herein.

TECHNICAL FIELD

The present disclosure relates to a navigation apparatus for a vehicle, and more particularly, to a navigation apparatus for a vehicle capable of efficiently updating new map data of a traveling route according to destination search, a method of updating map data thereof, and a vehicle using the same.

BACKGROUND

In general, a driver can receive map information including geographical information, region information linked to the geographical information, and event information using a navigation device installed in a vehicle, thereby receiving services such as route search, restaurant search, lodging search, tourist spot search, and the like.

However, the driver needs to frequently update the map information in order to acquire accurate map information.

To update the map information, as one method, the driver may access a navigation service system using a storage device and download new map information, thereby updating map information.

However, such a map information update method requires a considerable time to download entire updated map information, in addition to inconvenience of using the separate storage device.

In addition, if map information is updated using an over the air programming (OTA) update method, a driver may be responsible for a data fee. If there is a large amount of map information to be updated, a lot of costs may be added for the update.

Accordingly, there is a need for a navigation apparatus for a vehicle capable of efficiently updating necessary map information without updating all map information at once so as to minimize cost and time, and a method of updating map data thereof.

SUMMARY

The present disclosure is directed to a navigation apparatus for a vehicle, a method of updating map data thereof, and a vehicle using the same that substantially obviate one or more problems due to limitations and disadvantages of the related art.

An object of the present disclosure is to provide a navigation apparatus for a vehicle capable of minimizing time and cost by updating map information based on new map data of regions located on a traveling route to minimize data consumption, a method of updating map data thereof, and a vehicle using the same.

Another object of the present disclosure is to provide a navigation apparatus for a vehicle capable of rapidly distinguishing a map data update region, by periodically checking whether new map data of a plurality of regions is present at a predetermined time interval and setting an update identifier with respect to a region having new map data, a method of updating map data thereof, and a vehicle using the same.

Another object of the present disclosure is to provide a navigation apparatus for a vehicle capable of rapidly distinguishing a map data update region, by checking whether new map data of a plurality of regions is present when a traveling route search request is received and setting an update identifier with respect to a region having new map data, a method of updating map data thereof, and a vehicle using the same.

Still another object of the present disclosure is to provide a navigation apparatus for a vehicle capable of rapidly distinguishing a map data update region from regions located on a traveling route, by checking whether new map data of the regions located on the traveling route is present when the traveling route is searched for and setting an update identifier with respect to a region having new map data, a method of updating map data thereof, and a vehicle using the same.

Yet another object of the present disclosure is to provide a navigation apparatus for a vehicle capable of rapidly and efficiently updating a map, by sequentially updating map information starting from a region closest to the current position of the vehicle among regions located on a traveling route, a method of updating map data thereof, and a vehicle using the same.

Another object of the present disclosure is to provide a navigation apparatus for a vehicle capable of providing an accurate and reliable traveling route, by re-searching for a traveling route when information of a predetermined region among regions located on the traveling route is updated, a method of updating map data thereof, and a vehicle using the same.

Further another object of the present disclosure is to provide a navigation apparatus for a vehicle capable of providing an accurate and reliable traveling route, by updating map information of regions located on a changed traveling route when the re-searched traveling route has been changed, a method of updating map data thereof, and a vehicle using the same.

Another object of the present disclosure is to provide a navigation apparatus for a vehicle capable of minimizing an update time and cost and increasing reliability, by stopping update of map information of a region when the vehicle enters the region, the map information of which is being updated, among regions located on a traveling route, and updating map information of a next region, a method of updating map data thereof, and a vehicle using the same.

The technical problems solved by the present disclosure are not limited to the above technical problems and other technical problems which are not described herein will become apparent to those skilled in the art from the following description.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to an exemplary embodiment of the present disclosure to achieve the above-described objects and other advantages, a navigation apparatus for a vehicle includes: a communication device configured to receive new map data; a memory configured to store map information updated based on the received new map data; a route search processor configured to search for a traveling route to a destination based on the stored map information, and a controller configured to control the communication device, the memory and the route search processor, wherein the controller controls the route search processor to search for the traveling route to the destination when a request for searching for the traveling route to the destination is received, checks whether new map data of regions located on the traveling route is present when the traveling route is searched for, controls the communication device to receive the new map data of the regions from an external server when the new map data of the regions is present, and updates the map information based on the received new map data.

The controller may check whether the new map data of a plurality of divided regions is present and set an update identifier with respect to a region having the new map data.

The update identifier may be at least one of a specific number, a specific color, a specific mark and a specific symbol.

Upon checking whether the new map data of the plurality of divided regions is present, the controller may check whether new map data of the plurality of divided regions is present at a predetermined time interval.

Upon checking whether the new map data of the plurality of divided regions is present, the controller may check whether new map data of the plurality of divided regions is present when a request for searching for a traveling route to a destination is received.

Upon checking whether the new map data of the plurality of divided regions is present, the controller may check whether new map data of the plurality of divided regions is present when a traveling route is searched for according to a request for searching for a traveling route to a destination.

Upon checking whether the new map data of the plurality of divided regions is present, the controller may check whether new map data of the regions located on a traveling route among the plurality of divided regions is present when the traveling route is searched for according to a request for searching for a traveling route to a destination.

Upon checking the new map data of the regions located on the traveling route is present if the traveling route is searched for, the controller may check whether the update identifier of the regions located on the traveling route is set and check whether the new map data of the regions is present based on the set update identifier.

When the traveling route is searched for, the controller transmits, to the external server, an inquiry signal inquiring whether the new map data of the regions located on the traveling route is present upon checking whether the new map data of the regions located on the traveling route is present, and checks whether the new map data of the regions is present based on a response signal received from the external server.

When the map information is updated based on the received new map data, the controller re-searches for the traveling route based on updated map information if map information of a second region is updated before the vehicle located in a first region among the regions located on the traveling route enters the second region.

The controller may check whether the re-searched traveling route has been changed when the traveling route is re-searched for, check whether the new map data of the regions located on a changed traveling route is present when the re-searched traveling route has been changed, receive the new map data of the regions from the external server when the new map data of the regions is present, and update the map data based on the received new map data.

Subsequently, when checking whether the re-searched traveling route has been changed, the controller may sequentially update map information of subsequent regions, which has not been updated, among regions located on a previous traveling route if the re-searched traveling route has not been changed.

In addition, when the map information is updated based on the received new map data, the controller stops update of map information of a second region and updates map information of a third region which is a next update region if the map information of the second region is not updated before the vehicle located in the first region among the regions located on the traveling route enters the second region.

According to another exemplary embodiment of the present disclosure, a method of updating map data of a navigation apparatus for a vehicle based on new map data received from an external server includes steps of: receiving, by a controller, a traveling route search request; searching, by the controller, for a traveling route to a destination according to the received traveling route search request; checking, by the controller, whether new map data of regions located on the traveling route is present when the traveling route is searched for; receiving, by the controller, the new map data of the regions when the new map data of the regions is present as a result of checking; and updating, by the controller, the map information based on the received new map data.

According to another exemplary embodiment of the present disclosure, a method of updating map data of a navigation apparatus for a vehicle based on new map data received from an external server includes: periodically checking, by a controller, whether new map data of each region is present from a map divided into a plurality of regions; setting, by the controller, an update identifier with respect to a region having the new map data when the new map data of each region is present as a result of checking; receiving, by the controller, a traveling route search request; searching for a traveling route to a destination according to the received traveling route search request; checking, by the controller, whether a region having the update identifier is present in regions located on the traveling route when the traveling route is searched for; receiving, by the controller, the new map data of the region when the region having the update identifier is present as a result of checking; and updating, by the controller, the map information based on the received new map data.

According to another exemplary embodiment of the present disclosure, a method of updating map data of a navigation apparatus for a vehicle based on new map data received from an external server includes: receiving, by a controller, a traveling route search request; searching, by the controller, for a traveling route to a destination according to the received traveling route search request; transmitting, by the controller, to the external server, an inquiry signal inquiring whether the new map data of the regions located on the traveling route is present when the traveling route is searched for; setting, by the controller, an update identifier with respect to a region having new map data among the regions located on the traveling route based on a received response signal when the response signal is received from the external server; receiving, by the controller, the new map data of the regions having the update identifier when the update identifier is set; and updating, by the controller, the map information based on the received new map data.

A computer-readable recording medium having recorded thereon a program for executing a method of updating map data of a navigation apparatus for a vehicle according to one embodiment of the present disclosure may perform a process provided by the method of updating the map data.

According to another exemplary embodiment of the present disclosure, a vehicle includes: a communication apparatus communicatively connected to an external server to receive new map data; and a navigation apparatus configured to update map information based on new map data received from the communication apparatus and to provide a traveling route to a destination. The navigation apparatus searches for a traveling route to the destination when a request for searching for the traveling route to the destination is received, checks whether new map data of regions located on the traveling route is present when the traveling route is searched for, receives the new map data of the regions from the external server when the new map data of the regions is present, and updates the map information based on the received new map data.

The aspects of the present disclosure are only part of the preferred embodiments of the present disclosure, and various embodiments based on technical features of the present disclosure may be devised and understood by a person with ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 2 to 5 are views illustrating a process of updating map information of regions located on a traveling route.

DETAILED DESCRIPTION

Figure 1:
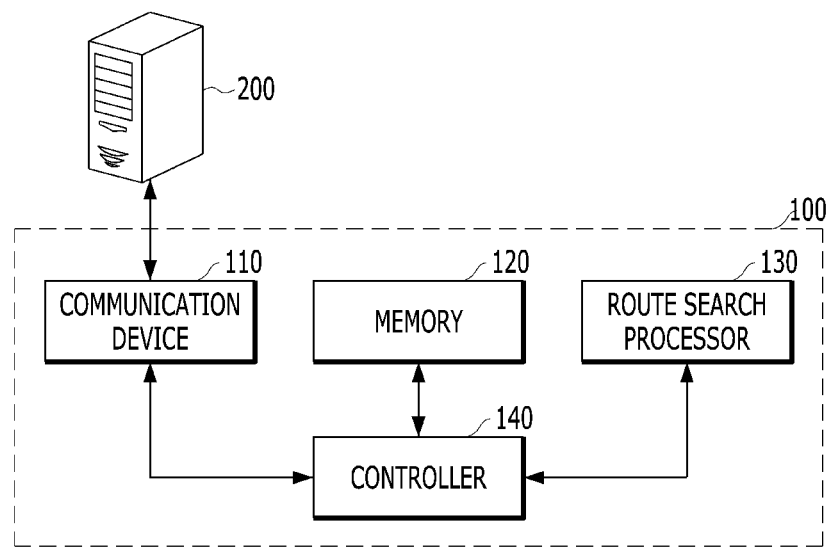
FIG. 1 is a block diagram illustrating a navigation apparatus for a vehicle according to the present disclosure.

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, a navigation apparatus for a vehicle, a method of updating map data thereof, and a vehicle using the same, which are applicable to the embodiments of the present disclosure, will be described in detail with reference to FIGS. 1 to 6.

FIG. 1 is a block diagram illustrating a navigation apparatus for a vehicle according to the present disclosure.

As shown in FIG. 1, a navigation apparatus 100 for the vehicle of the present disclosure may include a communication device 110 for receiving new map data, a memory 120 for storing updated map information based on the received new map information, a route search processor 130 for searching for a traveling route to a destination based on the stored map information, and a controller 140 for controlling the communication device 110, the memory 120, and the route search processor 130.

The controller 140 may control the route search processor 130 to search for the traveling route to the destination when a request for searching for a traveling route to a destination is received, check whether new map data of regions located on the traveling route is present when the traveling route is searched for, control the communication device 110 to receive new map data of the regions from an external server 20 when new map data of the regions is present, and update map information based on the received new map data. Here, the controller 140 is a hardware device and may be an electronic control unit (ECU).

In the present disclosure, the memory 120 may include various types of volatile or non-volatile storage media. For example, the memory 120 may include a read only memory (ROM) and a random access memory (RAM). Further, the communication device 110 is a hardware device and transmit and receive wireless signals including data to and from a terminal within a distance from the communication device 110 through communication schemes, such as Low Frequency (LF), a Radio Frequency (RF), Wireless LAN, Wi-Fi, Bluetooth, Zigbee, Wi-Fi Direct (WFD, Ultra wideband (UWB), Infrared Data Association (IrDA), Bluetooth Low Energy (BLE), and Near Field Communication (NFC). Examples of the communication device 110 include a computer modem, a network interface card (NIC), Wi-Fi devices, an access point, etc.

In addition, the communication device 110, the memory 120, and the route search processor 130 may be electric circuitries which perform various functions described below by execution of instructions embedded therein, or they are embedded in the controller 140 as one device. In particular, the route search processor 130 may be a control unit which can be embedded in the controller 140.

For example, the map information may include maps divided into a plurality of regions having predetermined areas.

The plurality of regions may have the same area, without being limited thereto. In some cases, the plurality of regions may have different areas. In addition, the plurality of regions may have identification information.

Here, the identification information of the regions stored in the memory 120 of the navigation apparatus 100 may also be stored in the external server, thereby identifying the divided regions using only the identification information.

In addition, the navigation apparatus 100 may receive and store the identification information of the divided regions of the map, upon first receiving and storing map information from the external server 200.

Subsequently, the controller 140 may check whether new map data of the plurality of divided regions is present.

That is, the controller 140 may transmit, to the external server 200, an inquiry signal inquiring whether new map data of the plurality of divided regions is present and check whether new map data of the plurality of divided regions is present based on a response signal received from the external server 200.

The controller 140 may set an update identifier with respect to a region having new map data, when checking whether the new map data of the plurality of divided regions is present based on the response signal received from the external server 200.

For example, the update identifier may be at least one of a specific number, a specific color, a specific mark and a specific symbol, without being limited thereto.

In addition, upon checking whether the new map data of the plurality of divided regions is present, the controller 140 may check whether the new map data of the plurality of divided regions is present at a predetermined time interval.

In some cases, upon checking whether the new map data of the plurality of divided regions is present, the controller 140 may check whether the new map data of the plurality of divided regions is present when a request for searching for a traveling route to a destination is received.

In other cases, upon checking whether the new map data of the plurality of divided regions is present, the controller 140 may check whether the new map data of the plurality of divided regions is present when a traveling route is searched for according to a request for searching for a traveling route to a destination.

In other cases, upon checking whether the new map data of the plurality of divided regions is present, the controller 140 may check whether the new map data of the plurality of divided regions is present when a traveling route is searched for according to a request for searching for a traveling route to a destination.

In this way, in the present disclosure, it is possible to check whether the new map data of the plurality of divided regions is present at various points in time.

Accordingly, in the present disclosure, by first checking whether new map data is present before updating each region and updating data of only necessary regions located on the traveling route of the vehicle, it is possible to minimize time and cost and to increase user satisfaction by efficient map update capable of minimizing data consumption.

In addition, in the present disclosure, it is possible to rapidly distinguish a map data update region, by setting an update identifier to identify a region where new map data need to be updated.

Accordingly, in the present disclosure, when setting an update identifier, it is possible to set an update identifier with respect to a region where new map data needs to be periodically updated at a predetermined time interval before receiving a traveling route search request.

In some cases, in the present disclosure, when setting an update identifier, it is possible to set an update identifier with respect to a region where new map data needs to be updated, if a request for searching for a traveling route to a destination is received.

In other cases, in the present disclosure, when setting an update identifier, it is possible to set an update identifier with respect to a region where new map data needs to be updated, when a traveling route is searched for according to a request for searching for a traveling route to a destination.

In other cases, in the present disclosure, when setting an update identifier, it is possible to set an update identifier with respect to a region where new map data needs to be updated, when a traveling route is searched for according to a request for searching for a traveling route to a destination.

Next, when checking whether the new map data of the regions located on the traveling route is present, the controller 140 may check whether update identifiers are set with respect to the regions located on the traveling route and check whether the new map data of the regions located on the traveling route is present based on the set update identifiers.

In addition, upon checking whether the new map data of the regions located on the traveling route is present, the controller 140 may transmit, to the external server 200, an inquiry signal for inquiring whether the new map data of the regions located on the traveling route is present and check whether the new map data of the regions located on the traveling route is present based on a response signal received from the external server 200.

Here, the controller 140 may distinguish a region where new map data needs to be updated by only the response signal received from the external server 200 without additionally setting the update identifier.

In addition, the controller 140 may set the update identifier with respect to a region having new map data if the new map data of the region is present, upon checking whether the new map data of the regions located on the traveling route is present based on the response signal received from the external server 200.

In addition, the controller 140 may sequentially update map information starting from a region closest to the current position of the vehicle among regions located on the traveling route, upon updating the map information based on the received new map data.

When the map information is sequentially updated starting from the region closest to the current position of the vehicle, it is possible to rapidly and efficiently update the map.

In addition, the controller 140 may update the map information of the regions other than a region where the vehicle is currently located, upon sequentially updating the map information.

This is because time and cost may be unnecessarily wasted when the map data of the region where the vehicle is currently located is updated.

Next, the controller 140 may re-search for the traveling route based on the updated map information if the map information of a second region is updated before the vehicle located in a first region among the regions located on the traveling route enters the second region, upon updating the map information based on the received new map data.

This is because an accurate and reliable traveling route can be provided.

The controller 140 may check whether the re-searched traveling route has been changed when the traveling route is re-searched for, check whether the new map data of the regions located on the changed traveling route is present when the re-searched traveling route has been changed, receive the new map data of the regions from the external server 200 when the new map data of the regions is present, and update the map information based on the received new map data.

Thus, it is possible to provide an accurate and reliable traveling route, by updating the map information of the regions located on the changed traveling route when the re-searched traveling route has been changed.

In addition, the controller 140 may sequentially update the map information of subsequent regions, which have not been updated, among the regions located on the previous traveling route if the re-searched traveling route has not been changed, upon checking whether the re-searched traveling route has been changed.

In addition, the controller 140 may guide traveling of the vehicle along the changed traveling route if the new map data of the regions is not present, upon checking whether the new map data of the regions located on the changed traveling route is present.

Next, the controller 140 may stop the update of the map information of a second region and update the map information of a third region which is a next update region, if the map information of the second region is not updated before the vehicle located in a first region among the regions located on the traveling route enters the second region, upon updating the map information based on the received new map data.

Therefore, it is possible to minimize update time and update cost and to increase reliability.

Subsequently, the controller 140 may guide traveling of the vehicle along the searched traveling route if the new map data of the regions is not present upon checking whether the new map data of the regions located on the traveling route is present, check whether the vehicle has arrived at the destination, and finish the travel guide of the vehicle when the vehicle has arrived at the destination.

In the present disclosure, by updating the map information based on the new map data of the regions located on the traveling route, it is possible to minimize time and cost and to increase user satisfaction by efficient map update capable of minimizing data consumption.

In the present disclosure, by periodically checking whether new map data of a plurality of regions is present at a predetermined time interval and setting an update identifier with respect to a region having new map data, it is possible to rapidly distinguish a map data update region.

In the present disclosure, by checking whether new map data of a plurality of regions is present when a traveling route search request is received and setting an update identifier with respect to a region having new map data, it is possible to rapidly distinguish a map data update region.

In the present disclosure, by checking whether new map data of the regions located on the traveling route is present when the traveling route is searched for and setting an update identifier with respect to a region having new map data, it is possible to rapidly distinguish a map data update region from the regions located on the traveling route.

In addition, in the present disclosure, it is possible to rapidly and efficiently update a map, by sequentially updating map information starting from a region closest to the current position of the vehicle among the regions located on the traveling route.

In addition, in the present disclosure, it is possible to provide an accurate and reliable traveling route, by re-searching for a traveling route when information of a predetermined region among regions located on a traveling route is updated.

In addition, in the present disclosure, it is possible to provide an accurate and reliable traveling route, by updating map information of regions located on a changed traveling route when the re-searched traveling route has been changed.

In addition, in the present disclosure, it is possible to minimize update time and cost and increasing reliability, by stopping update of map information of a region when the vehicle enters the region, the map information of which is being updated, among regions located on a traveling route, and updating map information of a next region.

That is, in the present disclosure, since update capacity is related to a data fee, over-the-air (OTA) update is performed only when new map data is present according to the destination search result, thereby minimizing update data capacity, reducing costs, and improving user satisfaction.

FIGS. 2 to 5 are views illustrating a process of updating map information of regions located on a traveling route.

Figure 2:
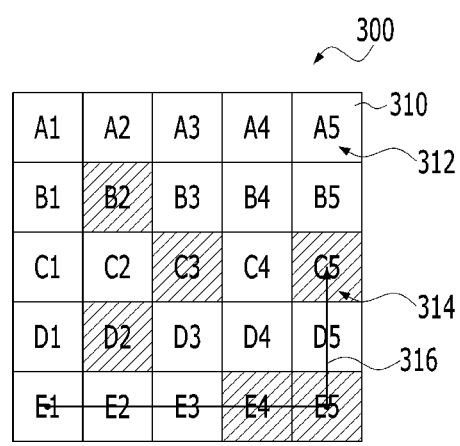

As shown in FIG. 2, the map information may include a map 300 divided into a plurality of regions having a predetermined area.

At this time, the plurality of regions 310 may be divided to have the same area, without being limited thereto.

In some cases, the plurality of regions 310 may be divided to have different areas.

In addition, each of the plurality of regions 310 has identification information 312.

Here, the identification information 312 of each region may be received along with the map 300 when the map information is first received from an external server.

Next, in the present disclosure, when checking whether new map data of the plurality of divided regions is present, an inquiry signal inquiring whether new map data of the plurality of divided regions is present may be transmitted to the external server and whether the new map data of the plurality of divided regions is present may be checked based on a response signal received from the external server.

Here, in the present disclosure, when checking whether the new map data of the plurality of divided regions is present based on the response signal received from the external server, an update identifier 314 may be set with respect to a region 310 having new map data.

For example, the update identifier 314 may be any one of a specific number, a specific color, a specific mark and a specific symbol, without being limited thereto.

In the present disclosure, the update identifier 314 may be set such that only regions having the new map data are distinguished, thereby rapidly distinguishing a map data update region.

Accordingly, in the present disclosure, upon setting the update identifier 314, it is possible to set the update identifier 314 with respect to a region where new map data needs to be periodically updated at a predetermined time interval before a traveling route search request is received.

In some cases, in the present disclosure, upon setting the update identifier 314, it is possible to set the update identifier 314 with respect to a region where new map data needs to be updated when a request for searching for a traveling route to a destination is received.

In another case, in the present disclosure, upon setting the update identifier 314, it is possible to set the update identifier 314 with respect to a region where new map data needs to be updated when a traveling route 316 is searched for according to a request for searching for a traveling route to a destination.

In another case, in the present disclosure, upon setting the update identifier 314, it is possible to set the update identifier 314 with respect to a region where new map data needs to be updated when a traveling route 316 is searched for according to a request for searching for a traveling route to a destination.

For example, as shown in FIG. 2, the update identifier 314 may be set in a color with respect to the region 310 having the new map data.

In the present disclosure, when a traveling route 316 from a departure region E1 to a destination region C5 is set, the new map data of a region E4, a region E5 and a region C5 having the update identifier 314 may be sequentially updated.

Subsequently, in the present disclosure, the traveling route may be re-searched for whenever the new map data of the region E4, the region E5 and the region C5 are updated.

In this way, in the present disclosure, upon re-searching for the traveling route, it is possible to update the new map data of the regions located on the changed traveling route if the traveling route is changed.

In the present disclosure, upon re-searching for the traveling route, whether the re-searched traveling route has been changed may be checked. When the re-searched traveling route has been changed, whether the new map data of the regions located on the changed traveling route is present may be determined. When the new map data of the regions is present, the new map data of the regions may be received from the external server. Then, the map information may be updated based on the received new map data.

In the present disclosure, when the re-searched traveling route has been changed, the map information of the regions located on the changed traveling route may be updated, thereby providing an accurate and reliable traveling route.

Figure 3:

For example, as shown in FIG. 3, in the present disclosure, when a traveling route from a departure region E1 to a destination region A5 is set, the new map data of a region E2, a region D3, a region B4 and a region A5 having the update identifier may be sequentially updated.

When the update of the new map data of the region E2 is completed before the vehicle enters the region E2, route re-search may be performed.

Subsequently, upon re-searching for the traveling route, if the traveling route has been changed by the updated new map data, it is possible to update the new map data of the next region B2 having the update identifier on the re-searched traveling route instead of the next region D3 having the update identifier on the previous traveling route.

In another example, as shown in FIG. 4, if the update of the new map data of the region E2 is completed before the vehicle enters the region E2, route re-search may be performed.

Upon re-searching for the traveling route, if the traveling route has not been changed by the updated new map data, it is possible to update the new map data of the next region D3 having the update identifier.

Figure 5:
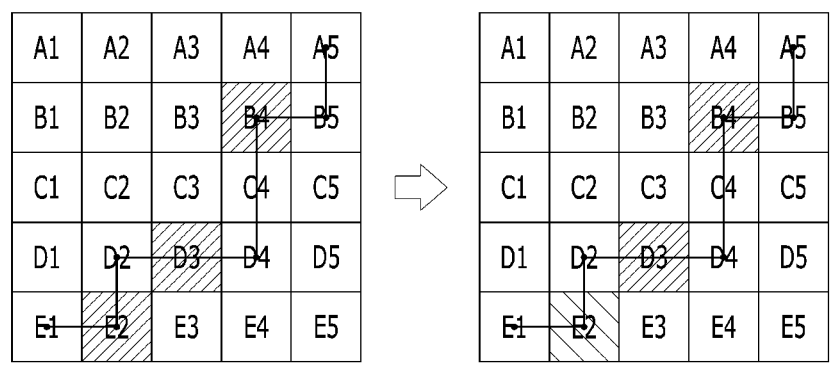

In another example, as shown in FIG. 5, when the update of the new map data of the region E2 is not completed before the vehicle enters the region E2, the update of the new map data of the region E2 may be stopped and the new map data of the next region having the update identifier may be updated.

In this way, in the present disclosure, when the map information is updated based on the new map data, if the map information of a second region is updated before a vehicle located in a first region among the regions located on a traveling route enters the second region, the traveling route may be re-searched for based on the updated map information.

In the present disclosure, when the re-searched traveling route has not been changed, the map information of next regions, which has not been updated, among the regions located on the previous traveling route may be sequentially updated.

In addition, in the present disclosure, if the new map data of the regions located on the changed traveling route is not present, traveling of the vehicle may be guided along the changed traveling route.

Subsequently, in the present disclosure, when the map information of the second region is not updated before the vehicle located in the first region among the regions located on the traveling route enters the second region, the update of the map information of the second region may be stopped and the map information of a third region which is a next update region may be updated.

To this end, it is possible to minimize update time and update cost and to increase reliability.

In the present disclosure, when the new map data of the regions located on the traveling route is not present, traveling of the vehicle may be guided along the searched traveling route, whether the vehicle has arrived at the destination may be checked, and the travel guide of the vehicle may be finished when the vehicle has arrives at the destination.

Figure 6:
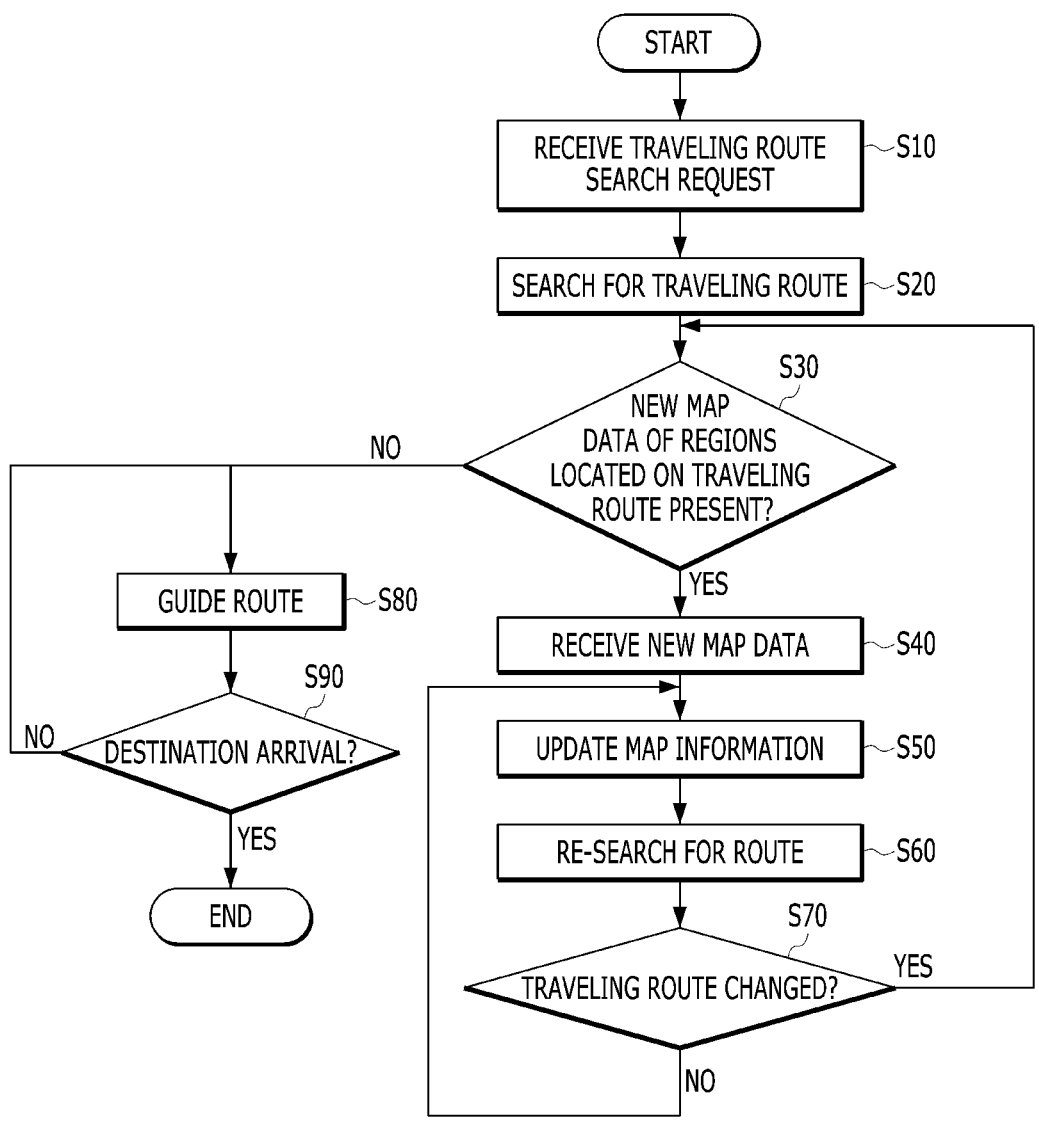
FIG. 6 is a flowchart illustrating a method of updating map information of a navigation apparatus for a vehicle according to the present disclosure.

FIG. 6 is a flowchart illustrating a method of updating map information of a navigation apparatus for a vehicle according to the present disclosure.

As shown in FIG. 6, in the present disclosure, a traveling route search request may be received through a user interface (S10).

Next, a traveling route to a destination may be searched for according to the received traveling route search request (S20).

Subsequently, when the traveling route is searched for, whether new map data of regions located on the traveling route is present may be checked (S30).

In the present disclosure, when the new map data of the regions is present as a result of checking, the new map data of the regions may be received (S40).

Next, map information may be updated based on the received new map data (S50).

Subsequently, when the map information of a second region is updated before the vehicle located in a first region among the regions located on the traveling route enters the second region, the traveling route may be re-searched for based on the updated map information (S60).

In the present disclosure, when the traveling route is re-searched for, whether the re-searched traveling route has been changed may be checked (S70).

Next, when the re-searched traveling route has been changed, step S30 of determining whether new map data of regions located on the changed traveling route is present may be repeatedly performed.

In step S70 of determining whether the re-searched traveling route has been changed, if the re-searched traveling route has not been changed, step S50 of updating the map information to sequentially update the map information of subsequent regions, which has not been updated, among the regions located on the previous traveling route may be repeatedly performed.

In step S30 of determining whether the new map data of the regions located on the changed traveling route is present, if the new map data of the regions is not present, traveling of the vehicle is guided along the searched traveling route (S80). Then, whether the vehicle has arrived at the destination may be checked (S90) and the travel guide of the vehicle may be finished when the vehicle has arrived at the destination as a result of checking.

In step S30 of determining whether the new map data of the regions located on the traveling route is present, whether the update identifier of the regions located on the traveling route is set may be checked and whether the new map data of the regions is present may be checked based on the set update identifier.

In some cases, in step S30 of determining whether the new map data of the regions located on the traveling route is present, an inquiry signal inquiring whether the new map data of the regions located on the traveling route is present may be transmitted to the external server and whether the new map data of the regions is present may be checked based on the response signal received from the external server.

Upon checking whether the new map data of the regions is present based on the response signal received from the external server, if the new map data of the regions is present as a result of checking, the update identifier may be set with respect to the region having the new map data.

In step S50 of updating the map information based on the received new map data, the map information may be sequentially updated starting from a region closest to a current position of the vehicle among the regions located on the traveling route.

In the present disclosure, when the map information is sequentially updated, the map information of regions other than a region where the vehicle is currently located may be updated.

In step S50 of updating the map information based on the received new map data, when the map information of the second region is updated before the vehicle located in the first region among the regions located on the traveling route enters the second region, the traveling route may be re-searched for based on the updated map information.

Subsequently, when the traveling route is re-searched for, whether the re-searched traveling route has been changed may be checked. When the re-searched traveling route has been changed, whether the new map data of the regions located on the changed traveling route is present may be checked. When the new map data of the regions is present, the new map data of the regions may be received from the external server. Then, the map information may be updated based on the received new map data.

In the present disclosure, when the re-searched traveling route has not been changed, the map information of the subsequent regions, which has not been updated, among the regions located on the previous traveling route may be sequentially updated.

Upon checking whether the new map data of the regions located on the changed traveling route is present, if the new map data of the regions is not present, traveling of the vehicle may be guided along the changed traveling route.

In step S50 of updating the map information based on the received new map data, if the map information of the second region is not updated before the vehicle located in the first region among the regions located on the traveling route enters the second region, the update of the map information of the second region may be stopped and the map information of a third region which is a next update region may be updated.

In some cases, before step S10 of receiving the traveling route search request, whether the new map data of each region is present may be periodically checked from the map divided into the plurality of regions and the update identifier may be set with respect to the region having the new map data when the new map data of each region is present as a result of checking.

Upon periodically determining whether the new map data of each region is present from the map divided into the plurality of regions, an inquiry signal inquiring whether the new map data of the plurality of divided regions is present may be transmitted to the external server and whether the new map data of each region is present may be checked based on the response signal received from the external server.

In addition, in step S10 of receiving the traveling route search request, when the traveling route search request is received, whether the new map data of each region is present may be checked from the map divided into the plurality of regions and the update identifier may be set with respect to the region having the new map data when the new map data of each region is present as a result of checking.

In step S20 of searching for the traveling route to the destination according to the received traveling route search request, whether the new map data of each region is present may be checked from the map divided into the plurality of regions and the update identifier may be set with respect to the region having the new map data when the new map data of each region is present as a result of checking.

In step S20 of searching for the traveling route to the destination according to the received traveling route search request, whether the new map data of the regions located on the traveling route is present may be checked from the map divided into the plurality of regions and the update identifier may be set with respect to the regions having the new map data when the new map data of the regions located on the traveling route is present as a result of checking.

A method of updating map data of a navigation apparatus for a vehicle according to a second embodiment of the present disclosure will now be described.

In the present disclosure, whether new map data of each region is present may be periodically checked from the map divided into the plurality of regions.

If the new map data of each region is present as a result of checking, the update identifier is set with respect to the region having the new map data.

Subsequently, when the traveling route search request is received, the traveling route to the destination is searched for according to the received traveling route search request.

Next, when the traveling route is searched for, whether a region having an update identifier is present among the regions located on the traveling route is checked.

When the region having the update identifier is present as a result of checking, the new map data of the region may be received and the map information may be updated based on the received new map data.

When the map information is updated based on the new map data, if the map information of a second region is updated before a vehicle located in a first region among the regions located on a traveling route enters the second region, the traveling route may be re-searched for based on the updated map information.

When the traveling route is re-searched for, whether the re-searched traveling route has been changed may be checked. When the re-searched traveling route has been changed, whether the new map data of the regions located on the changed traveling route is present may be checked. When the new map data of the regions is present, the new map data of the regions may be received from the external server. Then, the map information may be updated based on the received new map data.

However, if the new map data of the regions is not present, traveling of the vehicle may be guided along the changed traveling route.

In the present disclosure, when the re-searched traveling route has not been changed, the map information of the subsequent regions, which has not been updated, among the regions located on the previous traveling route may be sequentially updated.

When the map information is updated based on the received new map data, if the map information of the second region is not updated before the vehicle located in the first region among the regions located on the traveling route enters the second region, the update of the map information of the second region may be stopped and the map information of a third region which is a next update region may be updated.

Subsequently, when checking whether the new map data of the regions located on the traveling route is present, if the new map data of the regions is not present, traveling of the vehicle may be guided along the searched traveling route and whether the vehicle has arrived at the destination may be checked. When the vehicle has arrived at the destination as a result of checking, the travel guide of the vehicle may be finished.

A method of updating map data of a navigation apparatus for a vehicle according to a third embodiment of the present disclosure will now be described.

When the traveling route search request is received, the traveling route to the destination is searched for according to the received traveling route search request.

When the traveling route is searched for, an inquiry signal inquiring whether the new map data of the regions located on the traveling route is present may be transmitted to the external server and, when the response signal is received from the external server, the update identifier may be set with respect to the region having the new map data among the regions located on the traveling route based on the received response signal.

Subsequently, when the update identifier is set, the new map data of the region having the update identifier may be received and the map information may be updated based on the received new map data.

In the present disclosure, when updating the map information based on the received new map data, if the map information of the second region is updated before the vehicle located in the first region among the regions located on the traveling route enters the second region, the traveling route may be re-searched for based on the updated map information.

When the traveling route is re-searched for, whether the re-searched traveling route has been changed may be checked. When the re-searched traveling route has been changed, whether the new map data of the regions located on the changed traveling route is present may be checked. When the new map data of the regions is present, the new map data of the regions may be received from the external server. Then, the map information may be updated based on the received new map data.

However, when the new map data of the regions is not present, traveling of the vehicle may be guided along the changed traveling route.

In the present disclosure, when the re-searched traveling route has not been changed, the map information of the subsequent regions, which has not been updated, among the regions located on the previous traveling route may be sequentially updated.

Upon updating the map information based on the received new map data, if the map information of the second region is not updated before the vehicle located in the first region among the regions located on the traveling route enters the second region, the update of the map information of the second region may be stopped and the map information of a third region which is a next update region may be updated.

Subsequently, upon checking whether the new map data of the regions located on the traveling route is present, if the new map data of the regions is not present, traveling of the vehicle may be guided along the searched traveling route and whether the vehicle has arrived at the destination may be checked. When the vehicle has arrived at the destination as a result of checking, the travel guide of the vehicle may be finished.

In addition, a computer-readable recording medium having recorded thereon a program for executing a method of updating map data of a navigation apparatus for a vehicle may perform a process provided by the method of updating the map data according to the first, second and third embodiments of the present disclosure.

A vehicle according to an embodiment of the present disclosure includes a communication apparatus communicatively connected to an external server to receive new map data, and a navigation apparatus configured to update map information based on new map data received from the communication apparatus and to provide a traveling route to a destination. The navigation apparatus searches for a traveling route to the destination when a request for searching for the traveling route to the destination is received, checks whether new map data of regions located on the traveling route is present when the traveling route is searched for, receives the new map data of the regions from the external server when the new map data of the regions is present, and updates the map information based on the received new map data.

In the present disclosure, by updating the map information based on the new map data of the regions located on the traveling route, it is possible to minimize time and cost and to increase user satisfaction by efficient map update capable of minimizing data consumption.

In the present disclosure, by periodically checking whether new map data of a plurality of regions is present at a predetermined time interval and setting an update identifier with respect to a region having new map data, it is possible to rapidly distinguish a map data update region.

In the present disclosure, by checking whether new map data of a plurality of regions is present when a traveling route search request is received and setting an update identifier with respect to a region having new map data, it is possible to rapidly distinguish a map data update region.

In the present disclosure, by checking whether new map data of the regions located on the traveling route is present when the traveling route is searched for and setting an update identifier with respect to a region having new map data, it is possible to rapidly distinguish a map data update region from the regions located on the traveling route.

In addition, in the present disclosure, it is possible to rapidly and efficiently update a map, by sequentially updating map information starting from a region closest to the current position of the vehicle among the regions located on the traveling route.

In addition, in the present disclosure, it is possible to provide an accurate and reliable traveling route, by re-searching for a traveling route when information of a predetermined region among regions located on a traveling route is updated.

In addition, in the present disclosure, it is possible to provide an accurate and reliable traveling route, by updating map information of regions located on a changed traveling route when the re-searched traveling route has been changed.

In addition, in the present disclosure, it is possible to minimize update time and cost and increasing reliability, by stopping update of map information of a region when the vehicle enters the region, the map information of which is being updated, among regions located on a traveling route, and updating map information of a next region.

That is, in the present disclosure, since update capacity is related to a data fee, over-the-air (OTA) update is performed only when new map data is present according to the destination search result, thereby minimizing update data capacity, reducing costs, and improving user satisfaction.

The disclosure can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A navigation apparatus for a vehicle, comprising:
   a communication device configured to receive new map data;
   a memory configured to store map information updated based on the received new map data;
   a route search processor configured to search for a traveling route to a destination based on the stored map information; and
   a controller configured to control the communication device, the memory, and the route search processor,
   wherein the controller controls the route search processor to search for the traveling route to the destination when a request for searching for the traveling route to the destination is received, checks whether the new map data of regions, including first, second, and third regions, located on the traveling route is present when the traveling route is searched for, controls the communication device to receive the new map data of the regions from an external server when the new map data of the regions is present, and updates the map information based on the received new map data,
   wherein the map information include a map divided into a plurality of regions, each of which having identification information,
   wherein, when the new map data and the identification information of a region corresponding to the new map data are received, the controller updates the map of the corresponding region based on the new map data and the identification information of the region, and
   wherein, when the map information of the second region is not updated completely before the vehicle located in the first region among the regions located on the traveling route enters the second region, the controller stops update of map information of the second region and updates map information of the third region which is a next region to be updated.

2. The navigation apparatus of claim 1, wherein, when the traveling route is searched for, the controller transmits, to the external server, an inquiry signal inquiring whether the new map data of the regions located on the traveling route is present upon checking whether the new map data of the regions located on the traveling route is present, and checks whether the new map data of the regions is present based on a response signal received from the external server.

3. The navigation apparatus of claim 1, wherein, when the map information is updated based on the received new map data, the controller re-searches for the traveling route based on the updated map information in a case in which map information of the second region is updated before the vehicle located in the first region among the regions located on the traveling route enters the second region.

4. The navigation apparatus of claim 3, wherein the controller checks whether the re-searched traveling route is changed when the traveling route is re-searched for, checks whether the new map data of the regions located on a changed traveling route is present when the re-searched traveling route is changed, receives the new map data of the regions from the external server when the new map data of the regions is present, and updates the map data based on the received new map data.

5. The navigation apparatus of claim 4, wherein, when checking whether the re-searched traveling route is changed, the controller sequentially updates map information of subsequent regions, which has not been updated, among regions located on a previous traveling route in a case in which the re-searched traveling route is not changed.

6. The navigation apparatus of claim 4, wherein, when checking whether the new map data of the regions located on the changed traveling route is present, the controller guides traveling of the vehicle along the changed traveling route in a case in which the new map data of the regions is not present.

7. A method of updating map data of a navigation apparatus for a vehicle based on new map data received from an external server, the method comprising:
   receiving, by a communication device, a traveling route search request;
   searching, by a controller, for a traveling route to a destination according to the received traveling route search request;
   checking, by the controller, whether new map data of regions, which include first, second, and third regions, located on the traveling route is present when the traveling route is searched for;
   receiving, by the controller, the new map data of the regions when the new map data of the regions is present as a result of checking; and
   updating, by the controller, map information based on the received new map data,
   wherein the map information include a map divided into a plurality of regions, each of which having identification information,
   wherein, when the new map data and the identification information of the region corresponding to the new map data are received, the map of the corresponding region is updated based on the new map data and the identification information of the region, and
   wherein, in the updating the map information based on the received new map data, when the map information of the second region is not updated completely before the vehicle located in the first region among the regions located on the traveling route enters the second region, updating of map information of the second region is stopped and map information of the third region which is a next update region is updated.

8. The method of claim 7, wherein the checking includes:
transmitting, to the external server, an inquiry signal inquiring whether the new map data of the regions located on the traveling route is present when the traveling route is searched for; and
checking whether the new map data of the regions is present based on a response signal received from the external server.

9. The method of claim 7, wherein the updating includes re-searching for the traveling route based on the updated map information when map information of the second region is updated before the vehicle located in the first region among the regions located on the traveling route enters the second region.

10. The method of claim 9, wherein the updating includes:
checking whether a re-searched traveling route is changed when the traveling route is re-searched for;
checking whether the new map data of the regions located on a changed traveling route is present when the re-searched traveling route is changed;
receiving the new map data of the regions from the external server when the new map data of the regions is present; and
updating the map information based on the received new map data.

11. A method of updating map data of a navigation apparatus for a vehicle based on new map data received from an external server, the method comprising:
periodically checking, by a controller, whether new map data of each region is present from a map divided into a plurality of regions;
setting, by the controller, an update identifier with respect to a region having the new map data when the new map data of each region is present as a result of checking;
receiving, by the controller, a traveling route search request;
searching, by the controller, for a traveling route to a destination according to the received traveling route search request;
checking, by the controller, whether a region having the update identifier is present in regions, which includes first, second, and third regions, located on the traveling route when the traveling route is searched for;
receiving, by the controller, the new map data of the region when the region having the update identifier is present as a result of checking; and
updating, by the controller, map information based on the received new map data,
wherein the map information include the map divided into the plurality of regions, each of which having identification information,
wherein, when the new map data and the identification information of the region corresponding to the new map data are received, the map of the corresponding region is updated based on the new map data and the identification information of the region, and
wherein, in the updating, when the map information of the second region is not updated completely before the vehicle located in the first region among the regions located on the traveling route enters the second region, updating of map information of the second region is stopped and map information of the third region which is a next update region is updated.

12. The method of claim 11, wherein the updating the map information based on the received new map data includes re-searching for the traveling route based on the updated map information when map information of the second region is updated before the vehicle located in the first region among the regions located on the traveling route enters the second region.

13. The method of claim 12, wherein the updating further includes:
checking whether a re-searched traveling route is changed when the traveling route is re-searched for;
checking whether the new map data of the regions located on a changed traveling route is present when the re-searched traveling route is changed;
receiving the new map data of the regions from the external server when the new map data of the regions is present; and
updating the map information based on the received new map data.

14. A method of updating map data of a navigation apparatus for a vehicle based on new map data received from an external server, the method comprising:
receiving, by a controller, a traveling route search request;
searching, by the controller, for a traveling route to a destination according to the received traveling route search request;
transmitting, by the controller, to the external server, an inquiry signal inquiring whether new map data of regions, which includes first, second, and third regions, located on the traveling route is present when the traveling route is searched for;
setting, by the controller, an update identifier with respect to a region having the new map data among the regions located on the traveling route based on a received response signal when the response signal is received from the external server;
receiving, by the controller, the new map data of the regions having the update identifier when the update identifier is set; and
updating, by the controller, a map information based on the received new map data,
wherein the map information include a map divided into a plurality of regions, each of which having identification information,
wherein, when the new map data and the identification information of the region corresponding to the new map data are received, the map of the corresponding region is updated based on the new map data and the identification information of the region,
wherein, in the updating, when the map information of the second region is not updated completely before the vehicle located in the first region among the regions located on the traveling route enters the second region, updating of map information of the second region is stopped and map information of the third region which is a next update region is updated.

15. The method of claim 14, wherein the updating includes re-searching for the traveling route based on updated map information when map information of the second region is updated before the vehicle located in the first region among the regions located on the traveling route enters the second region.

16. The method of claim 15, wherein the updating further includes:
checking whether a re-searched traveling route is changed when the traveling route is re-searched for;

checking whether the new map data of the regions located on a changed traveling route is present when the re-searched traveling route is changed;
receiving the new map data of the regions from the external server when the new map data of the regions is present; and
updating the map information based on the received new map data.

* * * * *